United States Patent [19]
Schuster

[11] Patent Number: 6,064,516
[45] Date of Patent: May 16, 2000

[54] ACHROMATIC LENS SYSTEM FOR ULTRAVIOLET RADIATION WITH GERMANIUM DIOXIDE GLASS

[75] Inventor: Karl-Heinz Schuster, Königsbronn, Germany

[73] Assignee: Carl-Zeiss-Stiftung, Heidenheim, Germany

[21] Appl. No.: 09/051,339

[22] PCT Filed: Aug. 15, 1997

[86] PCT No.: PCT/EP97/04468

§ 371 Date: Apr. 6, 1998

§ 102(e) Date: Apr. 6, 1998

[87] PCT Pub. No.: WO98/07666

PCT Pub. Date: Feb. 26, 1998

[30] Foreign Application Priority Data

Aug. 16, 1996 [DE] Germany .................. 196 33 128

[51] Int. Cl.[7] .............. G02B 13/14; F21V 5/20; G03B 27/42

[52] U.S. Cl. .............. 359/350; 359/355; 359/361; 355/53

[58] Field of Search .................. 359/350, 355, 359/361; 355/53

[56] References Cited

PUBLICATIONS

"Consolidation of GeO2 soot body prepared by flame hydrolysis reaction" by S. Sakaguchi, Journal of Non–Crystalline Solids, vol. 171, No. 3, 1994, pp. 228–229.

*Primary Examiner*—Audrey Chang
*Attorney, Agent, or Firm*—Walter Ottesen

[57] ABSTRACT

An achromatic lens system, in particular for uses in the deep ultraviolet range below 350 nm wavelength, and therefore especially for projection exposure systems for microlithography, combines quartz glass with lenses made of germanium dioxide glass ($GeO_2$). The production of $GeO_2$ glass by CVD on an amorphous base made of the same material is described.

8 Claims, 1 Drawing Sheet

ACHROMATIC LENS SYSTEM FOR ULTRAVIOLET RADIATION WITH GERMANIUM DIOXIDE GLASS

This application is a 371 Filing of PCT/EP/97/04468 filed on Aug. 15, 1997.

FIELD OF THE INVENTION

The invention relates to an achromatic lens system for ultraviolet rays, a projection exposure system and a method for making optical glass from germanium dioxide.

BACKGROUND OF THE INVENTION

The difficulties of achromatization in the deep ultraviolet are known. Except for quartz glass, essentially only crystalline materials are available. Here, problems are caused by the anisotropy of the crystals which, in addition to the double refraction, also leads to poor manufacturability of polished curved surfaces. In addition, the possible materials are poorly resistant to environmental influences.

This is described in U.S. Pat. No. 5,028,967. Here, as a solution to the problem, the use of $SiO_2$ glass with $GeO_2$ admixed (also together with boroxide) is given. What is claimed is a $GeO_2$ content up to 50 mol %. The example having the highest $GeO_2$ content has 13.5 mol % $GeO_2$ and preferably, the content is up to 30 mol %. The deviations of the index of refraction, dispersion and Abbe number compared to pure quartz glass are small. Accordingly, the achromatization is difficult.

The production of amorphous germanium oxide from colorless glass is known per se, for example, from Ullmann's "Encyklopädie der technischen Chemie", 4th edition, Volume 12, Weinheim New York 1985, article "Germanium und Germanium-Verbindungen", pages 221 to 226, key word "Germaniumdioxid", page 225 and from the FR-A 20 18 484 which is cited there (page 1, lines 12 to 19, corresponding search report, as well as title and short analysis of the citation "Secrist and Mackenzie").

In one version, crystalline $GeO_2$ is generated from $GeCl_4$ by hydrolysis, melted and rapidly cooled down. This serves as an input material for milling as a powdered catalytic material. From an oxygen plasma having $C_2H_5OGe$, Secrist and Mackenzie allow $GeO_2$ to deposit onto a cooler base from the gas phase and thereby generate a non-crystalline film.

$GeO_2$ glass bodies are, however, not known as usable lens blanks.

In the above-mentioned text of Ullmann, key word "Germanate", page 225, optical glasses of germanates, for example, $Zn_2GeO_4$, are known which have a high refractive index.

SUMMARY OF THE INVENTION

It is the object of the invention to provide an achromatic lens system having good transmission in the deep ultraviolet (DUV) and a projection illuminating system having such an achromatic lens system. It is intended to provide a glass, which is suitable therefor in combination with quartz glass.

The achromatic lens system for ultraviolet rays of the invention includes: a first lens defining an optical axis and being made of quartz glass or a glass containing mostly quartz; and, a second lens arranged on the axis and being made of glass mostly of germanium dioxide, especially over 70% by weight.

The projection exposure system of the invention includes: a light source having a wavelength of 350 nm or less and defining an optical axis; and, the above achromatic lens system.

The method of the invention is for making optical glass of germanium dioxide and includes the steps of: producing a base body from a highly pure powdered germanium dioxide; depositing amorphous germanium dioxide uniformly onto the base body from a combustion plasma of germanium tetrachloride or germanium tetrahydride with pure oxygen; and, thereafter, rapidly cooling the deposited base body.

With germanium dioxide glass of optical quality, a DUV transparent material is made available which is non-crystalline and therefore shows no polarization effects and can be polarized and is manipulable. In addition, it has a clearly higher dispersion than quartz glass so that the larger converging lenses in the achromatic lens system can be made from the technologically mature quartz glass and the new material is used in the smaller format of the diverging lenses.

In addition, advantageously large differences result with respect to quartz glass with an Abbe number $v_D$=40.946 and a refractive index of $n_D$=1.6075 (measured values on a sample prism of 1 cm edge length). This simplifies the configuration of an achromatic lens system with respect to U.S. Pat. No. 5,028,967.

Admixtures of other substances in the germanium dioxide glass (in total, however, less than 50% and preferably minimum quantities) are possible.

For this application, known fluorides ($CaF_2$, et cetera, for example, U.S. Pat. No. 4,977,426) have only a slightly departing dispersion, which is less, and are crystalline except $BeF_2$ which is highly poisonous. Other crystals, such as halogenides (NaCl, et cetera) or phosphates, have a higher dispersion than quartz glass but have similar disadvantages (for example, crystal faults).

Pure substances have basically the advantage of higher transmission in the deep ultraviolet range compared to the glass mixture of U.S. Pat. No. 5,289,967 which contains $GeO_2$. The differences of the optical characteristics are, however, greater.

In the illuminating beam path very small lenses made of $GeO_2$ can be used, for example, as elements of a honeycomb condenser.

The method of manufacture provided by the invention affords the advantage that $GeCl_4$ is available in a suitable highly pure form as industry standard from the production of germanium single crystals. The manufacture of a disc as a supporting body can take place in accordance with one of the mentioned methods or with the method presented here.

BRIEF DESCRIPTION OF THE DRAWINGS

The invention is explained in greater detail with respect to the drawings.

DESCRIPTION OF THE PREFERRED EMBODIMENTS OF THE INVENTION

Figure 1:
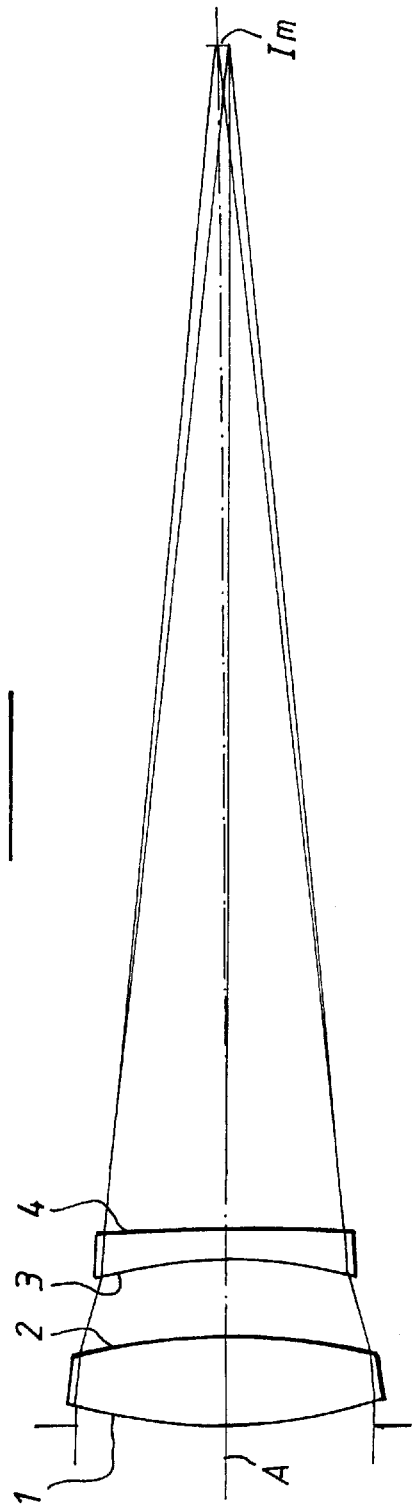
FIG. 1 shows an exemplary achromatic lens system having a quartz glass converging lens and a germanium dioxide diverging lens; and, FIG. 2 schematically shows a projection exposure system having $GeO_2$ glass lenses in illumination and projection objective.

The achromatic lens system of FIG. 1 has the construction data of the Table 1 with the lens surfaces (1, 2) of the converging quartz lens and the lens surfaces (3, 4) of the diverging germanium dioxide lens. The achromatic lens system images the object Ob from infinity onto the image plane Im with a longitudinal chromatic aberration CHV≈3.3

μm at the wavelength λ=312.56±5 nm. (For 248.5±5 nm, CHV=19 μm; at 248.5±0.5 nm, CHV=0.5 μm). The ratio of the Abbe number of quartz to $GeO_2$ glass is 2.47 at this wavelength λ=312.5±10 nm. The comparison value for calcium fluoride is 0.70.

Because of the large dispersion difference of germanium dioxide glass to quartz glass, the Gaussian error can be corrected even for an achromatic lens system having an air gap as in this example.

Figure 2:
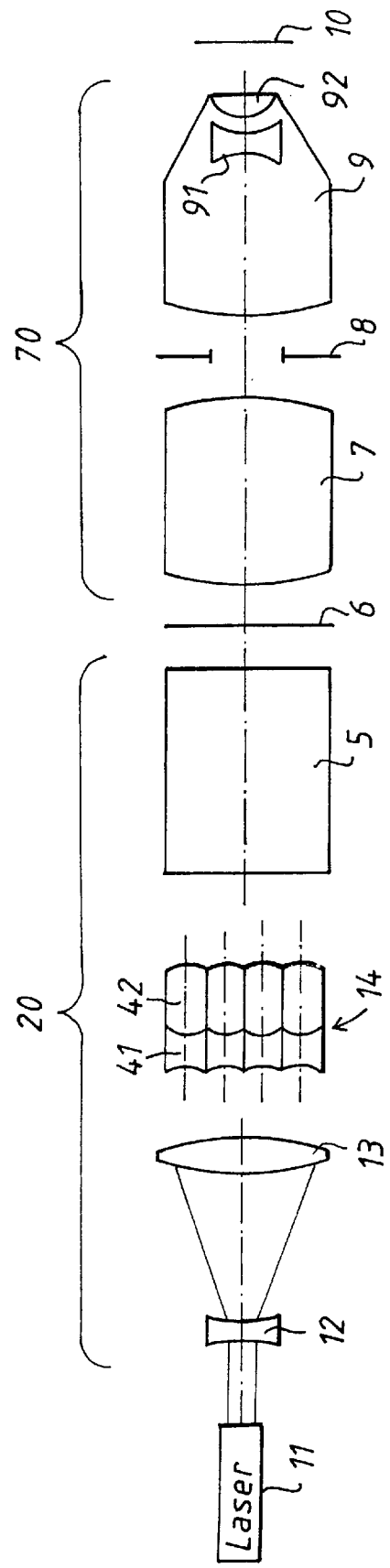

FIG. 2 shows a deep ultraviolet projection exposure system wherein germanium oxide glass lenses (12, 41, 91) in combination with quartz lenses (13, 42, 5, 7, 92) function to achromatize in the illuminating system 20 as well as in the projection objective 70.

The laser 11 is usually an excimer laser for the deep ultraviolet range. Alternatively, a mercury discharge lamp can be provided, for example, for the 312.5 nm line.

A beam widening lens system (12, 13) is achromatized by the selection of the diverging lens 12 of $GeO_2$ and the converging lens 13 of quartz glass. The honeycomb condenser 14 (often utilized for homogenization) in the example also comprises an array of $GeO_2$ diverging lenses 41 and quartz glass converging lenses 42. These groups (12, 13; 41, 42) can also exhibit a chromatic overcompensation which, with the further optic 5, then provides an achromatic illumination in the reticle plane 6. The projection objective 70 having the aperture diaphragm 8 and the lens groups 7 and 9 likewise preferably has a $GeO_2$ diverging lens 91 in the range of small beam diameters. Lens 92 is, as the remaining lenses, made of quartz glass. Additional lenses (not shown) of the lens groups (5, 7, 8) can be made of $GeO_2$ glass and improve the achromatization. The wafer to be illuminated is arranged in the image plane 10.

The manufacture of germanium dioxide glass takes place by chemical deposition from the vapor phase wherein a combustion plasma of germanium tetrachloride or germanium tetrahydride (both are substances available in the semiconductor industry in suitable purity) with pure oxygen is deposited on a support plate of amorphous germanium dioxide. The support plate can be produced by molding (sintering) germanium dioxide powder which can be obtained in accordance with one of the given methods of the state of the art.

Alternatively, the same $GeO_2$ powder can be melted at 1,500° C. for approximately 20 hours in a platinum/iridium crucible and then be slowly cooled and removed from the crucible by milling and sawing. The $GeO_2$ glass disc has a thickness up to approximately 3 cm and a diameter of 25 cm and greater. The $GeO_2$ glass disc is deteriorated with respect to absorption in the deep ultraviolet range because of the transition of the crucible material into the melt.

The lower side of this primary $GeO_2$ glass disc (bubbles wander in the melt upwardly and therefore the material below is more homogeneous) is now processed and fine-optically polished. Thereupon, the CVD deposition of the pure $GeO_2$ glass is carried out.

The support plate can be again used because the layer grown thereupon is separated near the boundary layer to the carrier plate and the surface can then again be polished. The homogeneity of the CVD deposition is ensured in a manner known per se by rotation and eccentric movements of the carrier plate and suitable heating.

When polishing, attention should be given that work is done in the absence of water (for example, with alcohol) because the recrystallization is facilitated by water. With air having up to 40% relative humidity, the manipulation of the polished $GeO_2$ glass lenses is possible without difficulty for sealing by thin optical layers which are anyway necessary as antireflecting layers.

TABLE 1

| No. | Radius (mm) | Distance (mm) | Material |
|---|---|---|---|
| Ob |  | ∞ |  |
| 1 | 33.555 | 5.904 | Quartz Suprasil |
| 2 | −45.723 | 5.306 |  |
| 3 | −33.666 | 2.000 | $GeO_2$ Glass |
| 4 | −300.102 | 80.315 |  |
| Im |  |  |  |

Numerical Aperature NA = 0.10

I claim:

1. An achromatic lens system for ultraviolet rays comprising:

a first lens defining an optical axis and being made of quartz glass or a glass containing mostly quartz; and, a second lens arranged on said axis and being made of glass containing over 70% by weight of germanium dioxide.

2. The achromatic lens system of claim 1, wherein said first lens is a converging lens and said second lens is a diverging lens.

3. An achromatic lens system for ultraviolet rays comprising:

a first lens defining an optical axis and being made of quartz glass or a glass containing mostly quartz; and, a second lens arranged on said axis and being made of pure germanium dioxide.

4. A projection exposure system comprising:

a light source having a wavelength of 350 nm or less and defining an optical axis; and, an achromatic lens system including:

a first lens defining an optical axis and being made of quartz glass or a glass containing mostly quartz; and, a second lens arranged on said axis and being made of glass containing over 70% by weight of germanium dioxide.

5. The projection exposure system of claim 4, wherein said light source is an excimer laser.

6. The projection exposure system of claim 4, wherein said light source is a UV laser without measures for spectral narrowing.

7. The projection exposure system of claim 4, wherein said light source supplies light transmitted along an illuminating beam path; and, said achromatic lens system is mounted in said illuminating beam path.

8. The projection exposure system of claim 4, further comprising a projection objective; and, said achromatic lens system being arranged in the projection objective.

* * * * *